Patented Jan. 25, 1944

2,339,888

UNITED STATES PATENT OFFICE 2,339,888

RECOVERY OF MOLYBDENUM AND TUNGSTEN FROM ORES

George S. Smith, Uravan, Colo., assignor to United States Vanadium Corporation, a corporation of Delaware No Drawing. Application August 8, 1942, Serial No. 454,131

8 Claims. (Cl. 23—18)

The invention relates to the recovery of molybdenum and tungsten from impure materials such as ores.

Molybdenum and tungsten frequently occur together in ores, and in the treatment and extraction of such ores the separation of these elements, one from the other, is usually desired. Sometimes the molybdenum and tungsten are present in such diverse forms that their separation by mechanical means is relatively easy. But in some ores, notably some scheelites, a substantial proportion of molybdenum is present as an isomorphic replacement of tungsten. Molybdenum occuring in such form is not fully separable from the tungsten by commercially practicable mechanical or chemical means heretofore proposed.

It is an object of the present invention to provide a method for recovering tungsten and molybdenum from impure materials. Another object is a method of separating tungsten and molybdenum from each other and from an ore containing both of such elements. A further object is a method of recovering tungsten and molybdenum separately from scheelite ores.

These objects are achieved by preferentially dissolving molybdenum and tungsten from an impure material containing these elements, separating insoluble material from the molybdenum-tungsten solution so prepared, precipitating and separating molybdenum sulfide from the molybdenum-tungsten solution, and then separating tungsten as tungstate from the remaining solution.

More particularly, in accordance with the invention an ore material containing molybdenum and tungsten, such as scheelite ore or a concentrate thereof, is finely ground and digested with an alkaline solution for a period of time sufficient to dissolve both molybdenum and tungsten. Preferably an alkaline hydroxide such as caustic soda is employed in the digestion and an excess of this reagent is used. The ground ore may be mixed with solid caustic soda in the proportions hereinafter indicated, and water may be added to the mixture to form a slurry. The digestion with caustic soda is preferably conducted at an elevated temperature, say about 130° C.; at this temperature, the digestion is usually completed in about five hours, a solution containing sodium molybdate and sodium tungstate and an insoluble residue containing calcium hydroxide being produced.

The solution derived from the digestion step is diluted with water, for example by adding one part of water for each part of solution, and is filtered to remove calcium hydroxide and other insoluble materials derived from the ore. The filtrate, containing sodium molybdate and sodium tungstate, is then treated with a sulfide, preferably an alkali metal sulfide such as sodium sulfide, to effect separation of molybdenum from tungsten, precipitating molybdenum sulfide while retaining tungsten in solution.

To effect the desired sharp separation of molybdenum from tungsten, careful control of the temperature and the pH of the molybdenum-tungsten solution must be exercised. The temperature of the solution is raised to between about 70° C. and its boiling point and is maintained at at least about 70° C. during the sulfide treatment to suppress precipitation of tungsten along with molybdenum. After the temperature of the solution has been adjusted, the sulfide is added, and the solution is acidified with a mineral acid, for example, sulfuric acid or hydrochloric acid, the latter being preferred if a tungsten product containing little sulfur is desired. The amount of acid necessary and the pH at which all the molybdenum will be precipitated depend on the amount of molybdenum in the solution. In general, a pH between 1 and 5 should be attained in the solution, a low concentration of molybdenum in the solution requiring a pH near the lower end of this range, but a pH near the higher end of the range is satisfactory if there is a high concentration of molybdenum in the solution. Preferably the solution is agitated during precipitation of molybdenum. After precipitation is complete, the molybdenum sulfide is removed by filtration and may be dried or otherwise treated to produce a salable molybdenum compound.

To the filtrate is added a suitable oxidizing agent, for example sodium chlorate, to reoxidize to tungstate any tungstite which may have been produced by the preceding steps. When sodium chlorate is used, experience has shown that one part by weight of sodium chlorate to about six and a half parts by weight of tungsten in solution is sufficient to oxidize all of the tungsten which may have been reduced in the sulfide treatment.

The sodium tungstate solution so produced may be evaporated to produce crystalline sodium tungstate, or it may be treated with a calcium compound to precipitate calcium tungstate therefrom. If calcium tungstate is to be precipitated the solution must be made alkaline. If lime or calcium hydroxide be used for precipitation, this material also serves to neutralize excess acid in the solution. The calcium hydroxide residue from the digestion step may be used for this purpose, or it may be convenient to use calcium chloride; but in the latter event the solution should first be treated with sufficient alkali to raise its pH to about 9. For most efficient precipitation the solution should be at a temperature of about 80° C., and should be agitated. Best results are obtained if calcium hydroxide is used as the precipitant, and its use is preferred. The precipitate of calcium tungstate is then separated by filtration and may be dried.

As pointed out above, it has been found by experience that it is desirable to employ an excess of sodium hydroxide in the digestion step. The amount used may be about three to five times the theoretical amount required by the equations:

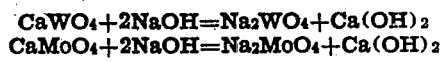

When an excess of caustic is used, it may be recovered by evaporating the alkaline solution of sodium tungstate and sodium molybdate obtained after digestion to crystallize sodium tungstate and sodium molybdate. Tests have shown that with a concentration of 400 grams of sodium hydroxide per liter, at a temperature of 20° C., 99% of the tungsten and 90% of the molybdenum are crystallized from the solution. The caustic liquor may be separated from the crystals by filtration and may be recycled for use in the digestion of additional ore. The crystallized sodium tungstate and sodium molybdate obtained by this procedure may be redissolved in warm water, and the solution thus obtained is then treated with sulfide as explained above.

To recover the greatest amount of molybdenum possible as molybdenum sulfide it is preferable to use somewhat more sodium sulfide than would be called for by the reaction:

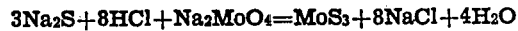

Experiments have shown that when the theoretical amount of sodium sulfide is used only about 90% of the molybdenum in solution is precipitated as molybdenum sulfide. If about 1.8 times the theoretical amount of sodium sulfide is used, 99.9% of the molybdenum in solution may be precipitated as molybdenum sulfide.

The following specific example of the application of the process of the invention serves to illustrate its principles. In the example all parts are by weight.

Example

One hundred parts of a scheelite concentrate containing 58% tungsten and 2.05% molybdenum were finely ground so that 80% passed a 200 mesh screen (0.074 mm. openings) and heated in a cast iron kettle at a temperature of about 130° C. for five hours with 100 parts of sodium hydroxide in aqueous solution. The mixture was agitated throughout the digestion, and water was added from time to time to replace that lost by evaporation. At the end of the digestion the mixture was diluted with an equal volume of cold water, and the solution was filtered in a vacuum filter.

The sodium tungstate-sodium molybdate filtrate was treated with 5.44 parts of a 10% solution of sodium sulfide. The solution was heated to about 70° C. and 322 parts of 18° Baumé commercial hydrochloric acid were then added to neutralize the alkali and to obtain a pH of 3 to 5 as indicated by a Congo red indicator. The solution was agitated for about one hour and the precipitated molybdenum sulfide was filtered from the solution.

The tungsten-containing filtrate was heated to about 85° C., and 7.8 parts of sodium chlorate were added to insure that all tungsten was present as tungstate. Calcium hydroxide in an amount sufficient to precipitate the soluble tungstate from solution as calcium tungstate was then added to the solution. The calcium tungstate precipitate was separated by filtration and dried.

Ninety-nine parts of dried calcium tungstate were produced containing 54.1% tungsten and 0.24% molybdenum. The ratio of tungsten to molybdenum was accordingly increased from 28.3 to 1 in the original concentrate to 226 to 1 in the final product. About 93% of the tungsten in the original concentrate was recovered in the final product as calcium tungstate.

While specific examples of the practice of the invention have been described in detail herein, the invention is not limited to or by such examples.

This application is in part a continuation of my copending application Serial No. 339,885, filed June 11, 1940.

I claim:

1. A process of separately recovering compounds of molybdenum and tungsten from an impure material containing compounds of such elements, which process comprises digesting such material with an alkaline solution, whereby preferentially to dissolve molybdenum and tungsten compounds therefrom; separating the molybdenum-tungsten solution from insolubles; adjusting the temperature of the solution to a temperature between about 70° C. and its boiling point; adding a sulfide to the molybdenum-tungsten solution, and acidifying the said solution with a mineral acid in the absence of organic acid while maintaining said solution at a temperature of at least 70° C., thereby precipitating and separating molybdenum sulfide from the molybdenum-tungsten solution; and then separating a tungstate from the solution.

2. A process of separately recovering compounds of molybdenum and tungsten from an impure material containing compounds of such elements, which process comprises digesting such material with an alkaline solution, whereby preferentially to dissolve molybdenum and tungsten compounds therefrom; separating the molybdenum-tungsten solution from insolubles; adjusting the temperature of the solution to a temperature between about 70° C. and its boiling point; adding an alkali metal sulfide to the molybdenum-tungsten solution, and acidifying the said solution to a pH of about 1 to 5 with a mineral acid in the absence of organic acid while maintaining said solution at a temperature of at least 70° C., thereby precipitating and separating molybdenum sulfide from the molybdenum-tungsten solution; oxidizing to tungstate reduced tungsten compounds remaining in solution and then separating a tungstate from the solution.

3. A process of separately recovering compounds of molybdenum and tungsten from an impure material containing compounds of such elements, which process comprises digesting such material with an alkaline solution, whereby preferentially to dissolve molybdenum and tungsten compounds therefrom; separating the molybdenum-tungsten solution from insolubles; adjusting the temperature of the solution to a temperature between about 70° C. and its boiling point; adding an alkali metal sulfide to the molybdenum-tungsten solution, and acidifying the said solution to a pH of about 1 to 5 with a mineral acid in the absence of organic acid while maintaining said solution at a temperature of at least 70° C., thereby precipitating and separating molybdenum sulfide from the molybdenum-tungsten solution; oxidizing to tungstate reduced tungsten compounds remaining in solution; adding a soluble calcium compound to the solution; and separating calcium tungstate from the solution.

4. A process of separately recovering compounds of molybdenum and tungsten from an ore containing compounds of such elements, which process comprises digesting said ore with an alkaline solution, thereby dissolving molybdenum and tungsten compounds; separating the molybdenum-tungsten solution so prepared from insolubles; concentrating the molybdenum-tungsten solution to crystallize molybdenum and tungsten compounds therein; filtering and removing excess alkali; redissolving the crystallized compounds so produced; adjusting the temperature of the solution so prepared to between 70° C. and its boiling point; adding an alkali metal sulfide to said solution, and acidifying it to a pH of about 1 to 5 with a mineral acid in the absence of organic acid while maintaining the solution at a temperature of at least 70° C., thereby precipitating molybdenum sulfide from the solution; oxidizing to tungstate reduced tungsten compounds remaining in solution and precipitating and separating a tungstate from the solution.

5. A process of separately recovering compounds of molybdenum and tungsten from an ore containing compounds of such elements, which process comprises digesting such ore with a solution of an alkali metal hydroxide, thereby dissolving molybdenum and tungsten as alkali metal molybdate and tungstate, separating the molybdate-tungstate solution from insolubles; concentrating the molybdate-tungstate solution to crystallize out of said solution water-soluble molybdate and tungstate; filtering and removing excess hydroxide; redissolving said molybdate and tungstate; adding an alkali metal sulfide to the solution so prepared, and acidifying the said solution to a pH of 1 to 5 with a mineral acid in the absence of organic acid, while maintaining said solution at a temperature of at least 70° C. but below its boiling point, thereby precipitating and separating molybdenum sulfide therefrom; and oxidizing to tungstate reduced tungsten compounds remaining in solution and adding a calcium compound to the solution, thereby precipitating and separating calcium tungstate therefrom.

6. A process of separately recovering compounds of molybdenum and tungsten from an ore containing compounds of such elements, which process comprises dissolving molybdenum and tungsten compounds from such ore by digesting the ore with a hot alkaline solution; filtering and removing insoluble material from the molybdenum-tungsten solution so prepared; adding an alkali metal sulfide to said molybdenum-tungsten solution in excess of the amount theoretically required to combine with all of the molybdenum in said solution, and acidifying said molybdenum-tungsten solution to a pH of about 1 to 5 with a mineral acid in the absence of organic acid while adjusting the temperature of said solution to at least about 70° C. but below its boiling point and maintaining said solution at such temperature, whereby to precipitate molybdenum sulfide from said solution but to suppress the precipitation of tungsten compounds; removing precipitated molybdenum sulfide from said solution; and oxidizing to tungstate reduced tungsten compounds remaining in solution and adding a calcium compound to the solution, thereby precipitating and removing calcium tungstate therefrom.

7. A process of recovering molybdenum and tungsten compounds separately from a solution containing molybdates and tungstates, which process comprises maintaining the temperature of said solution between about 70° C. and the boiling point of the solution, adding a sulfide to said solution, and acidifying it to a pH of about 1 to 5 with a mineral acid in the absence of organic acid, thereby precipitating and separating molybdenum sulfide from said solution; oxidizing to tungstate reduced tungsten remaining in solution and then separating a tungstate from the solution.

8. A process of recovering molybdenum and tungsten compounds separately from a solution containing molybdates and tungstates, which process comprises maintaining the temperature of said solution between about 70° C. and the boiling point of the solution, adding an alkali metal sulfide to said solution, and acidifying it to a pH of about 1 to 5 with a mineral acid in the absence of organic acid, thereby precipitating and separating molybdenum sulfide from said solution; and oxidizing to tungstate reduced tungsten compounds remaining in solution and adding a calcium compound to the solution, thereby precipitating and separating calcium tungstate therefrom.

GEORGE S. SMITH.